(No Model.)

J. K. VOORHEES.
CHECK ROW ATTACHMENT FOR CORN PLANTERS.

No. 315,981. Patented Apr. 14, 1885.

WITNESSES:
John D. Reemer
C. Sedgwick

INVENTOR:
J. K. Voorhees
BY Munn & Co.
ATTORNEYS.

UNITED STATES PATENT OFFICE.

JOHN K. VOORHEES, OF PELLA, IOWA.

CHECK-ROW ATTACHMENT FOR CORN-PLANTERS.

SPECIFICATION forming part of Letters Patent No. 315,981, dated April 14, 1885.

Application filed August 14, 1884. (No model.)

*To all whom it may concern:*

Be it known that I, JOHN K. VOORHEES, of Pella, in the county of Marion and State of Iowa, have invented a new and Improved Check-Row Attachment for Corn-Planters, of which the following is a full, clear, and exact description.

This invention relates to certain improvements in my new check-row attachment for corn-planters covered by Letters Patent No. 271,167, dated January 23, 1883; and the present invention consists of the construction, arrangement, and combination of parts, all as hereinafter described and claimed.

Reference is to be had to the accompanying drawings, forming part of this specification, in which similar letters of reference indicate corresponding parts in all the figures.

Figure 1:
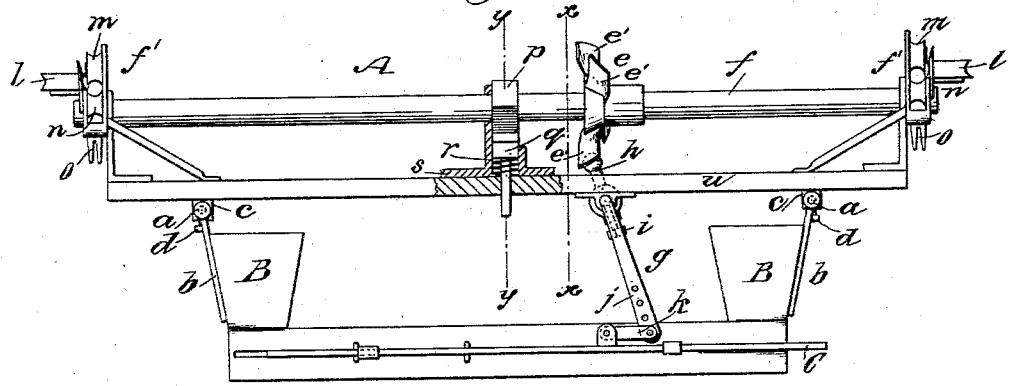
Figure 2:
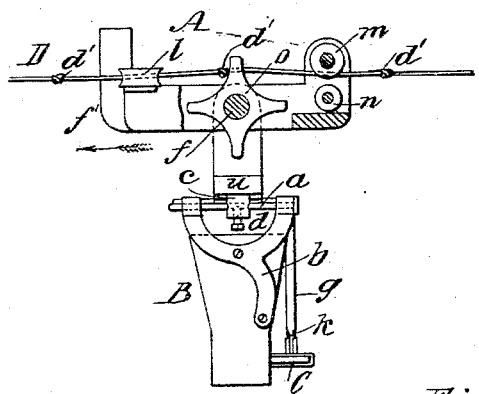
Figure 3:
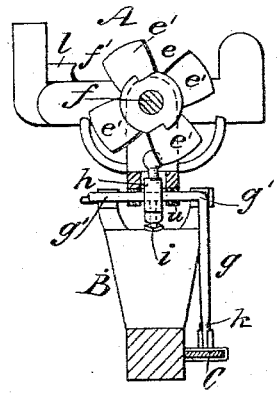
Figure 4:
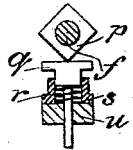

Figure 1 is a broken rear elevation of my invention. Fig. 2 is a broken end elevation of the same. Fig. 3 is a sectional elevation taken on the line $x\ x$ of Fig. 1, and Fig. 4 is a detailed sectional elevation taken on the line $y\ y$ of Fig. 1.

It is well known that any change of the running action of a corn-planter having a check-rower attached changes the relative position of the check-rower with the seed-exit of the planter. For instance, in setting the planter to run deeper, the heel of the planter and seed-exit will be thrown forward and the check-rower backward a short distance, so that the seed will not be dropped in rows both ways across the field. The act of setting the planter to run shallower has a like but opposite effect, causing the seed to be dropped too soon, and the raising or lowering of the tongue of the planter has the effect also of disarranging the drop. This difficulty I overcome by attaching the check-rower A to the hoppers B B, or other part or parts of the planter, by means that permit the check-rower to be adjusted forward or backward. In this instance I employ for this purpose the rods $a$, held by the irons $b$, and the heads $c$, through which the rods $a$ pass, so that by loosening the set-screws $d$ in the heads $c$ the check-rower may be moved along the rods $a$ to the desired relative position with the heel of the planter, and there held by turning down the said set-screws $d$.

The dropping bar or slide C is reciprocated by the diagonal arms of the cam $e$ on shaft $f$ in substantially the same manner as described in my above-mentioned patent, except that the rod $g$ is bent to form the horizontal portion $g'$, to permit the adjustment of the check-rower without breaking the connection of the cam with the bar C, and the horizontal portion of the rod $g$ has secured to it by the set-screw $i$ the arm $h$, against which the diagonal arms $e'$ of the cam $e$ strike on opposite sides alternately to reciprocate the rod $g$ for moving the plate C, as set forth in the above-mentioned patent. The lower end of the rod $g$ in this instance has the series of holes $j$ formed in it, and is connected to the plate or bar C by the link $k$, which may be raised or lowered in the holes $j$, for adjusting the check-rower to suit the stroke of the planter to which it may be attached.

The yokes $f'\ f'$, carrying the anti-friction wheels $l\ m\ n$ for the field wire or cord D, are of the same construction as in my above-mentioned patent, and the shaft $f$ is provided with the sprocket-wheels $o\ o$, the arms of which are forked to receive the field-rope D, so that the knots or obstructions $d'$ thereof will revolve the shaft $f$ intermittently, the same as in said patent. To prevent the shaft $f$ from being revolved too far in passing each knot $d'$, I form or provide it with the square portion or nut $p$, against which the stop $q$ is constantly pressed by the spring $r$, the stop and spring being held in the suitably-recessed plate $s$, secured to the bars $u$ of the check-rower immediately under the nut $p$, as shown in Fig. 1, so that the stop $q$ bearing against the nut will prevent all revolution of the shaft from mere momentum or friction of the sprocket-wheels $o$ with the field cord or wire; and in order that the stop $q$ shall not materially interfere with the revolution of the shaft $f$, I form or key the nut $p$ to the shaft $f$, so that each corner of the nut stands slightly forward of the points of contact of the arms $e'$ of cam $e$ with the arms $h$, so that the said arms of the cam will not come in contact with the arm $h$ until a corner of the nut has pressed down the stop $q$, when the spring $r$, lifting on the corner of the nut now out of line with the shaft $f$, serves to help turn the shaft while one of the arms $e'$ of the cam $e$ is causing the plate C to perform its stroke, so that about all the strain the check-rower causes upon the field wire or rope D is to depress the spring $r$, and in this manner a very rapid operation of the dropping mechanism is secured, which is very essential to cause the hills to be dropped always in the right spot.

To adjust the check-rower forward or backward to suit the planter, it is only necessary to loosen the three set-screws $d\ d\ i$ and move it upon the rods $a\ a$ and $g'$, and to tighten said set-screws again, so that with this improvement no difficulty will be experienced in always causing the hills to be dropped to form rows both ways of the field, and no difficulty will be experienced in effecting the proper adjustment of the parts.

Having thus fully described my invention, I claim as new and desire to secure by Letters Patent—

1. In a check-row attachment for corn-planters, the combination, with the support $u$, connected adjustably to rods $a$, supported in armed or bifurcated bars $b$, fastened to the hoppers or to their supports, of the shaft $f$, carrying the cam $e$, and the right-angled bar or rod $g$, having the adjustable arm $h$, and connected to the dropping-plate C, substantially as and for the purpose set forth.

2. The rod $g$, for reciprocating the dropping-plate C, bent to form the horizontal portion $g'$, in combination with the adjustable arm $h$ and the cam $e$ of the shaft $f$, arranged substantially as described.

3. In a check-row attachment for corn-planters, the support $u$, connected adjustably to rods $a$, supported in armed or bifurcated bars $b$, fastened to the hoppers or their supports, in combination with the shaft $f$, carrying the cam $e$, and the right-angled bar or rod $g$, having the adjustable arm $h$, and connected adjustably to the dropping slide or plate C, the nut or cam $p$ upon the shaft $f$, and the yielding or spring bearing $q$ for said nut or cam $p$, substantially as and for the purpose specified.

JOHN K. VOORHEES.

Witnesses:
CHAS. PORTER,
N. J. GESMAN.